H. P. BALL.
ELECTRIC STORAGE DEVICE.
APPLICATION FILED MAR. 11, 1912.
1,077,507.
Patented Nov. 4, 1913.
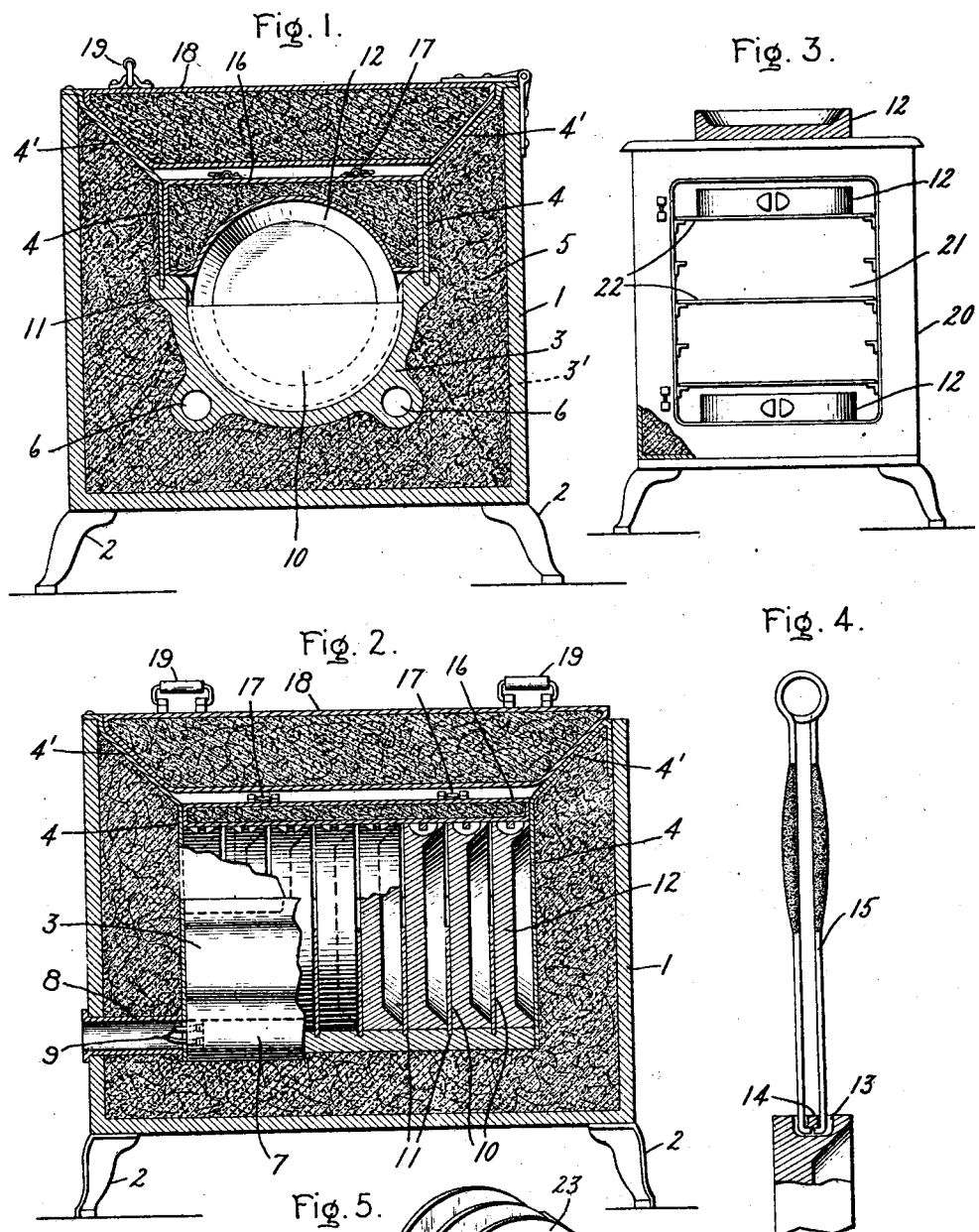
Witnesses:
Inventor:
Henry Price Ball,
by His Attorney.

UNITED STATES PATENT OFFICE.

HENRY PRICE BALL, OF PITTSFIELD, MASSACHUSETTS, ASSIGNOR TO GENERAL ELECTRIC COMPANY, A CORPORATION OF NEW YORK.

ELECTRIC STORAGE DEVICE.

1,077,507.  Specification of Letters Patent.  Patented Nov. 4, 1913.

Application filed March 11, 1912. Serial No. 682,964.

*To all whom it may concern:*

Be it known that I, HENRY PRICE BALL, a citizen of the United States, residing at Pittsfield, in the county of Berkshire and State of Massachusetts, have invented certain new and useful Improvements in Electric Storage Devices, of which the following is a specification.

My invention relates to devices for storing heat which is generated electrically.

The object of my invention is to provide an efficient and economical device of that character, which will permit the heat so generated to be transferred to any place where it is desired to utilize the same and which will be particularly adapted for use in connection with operations such as cooking which require heat to be supplied intermittently.
According to my invention, heat is stored in one or more heat storage units which are so constructed and arranged that they may be readily removed to the place where the heat is to be utilized. Preferably, instead of having one large heat storage unit, I provide a sectional device consisting of several small sections which may be heated from the same source. I also provide insulating means so as to conserve the heat in the storage units when they are not being used for the cooking or other intermittent operation.

In the drawing, Figure 1 is a transverse section of a heat storage apparatus according to my invention; Fig. 2 is a partial longitudinal section of the same; Fig. 3 is an elevation partly in section of a range which may constitute means for utilizing the heat contained in the storage sections, the door of the range being removed. Fig. 4 is a detail view showing a means for removing a storage section from the storage heater. Fig. 5 is a detail view showing a modification of a portion of the heat storage mass.
The storage heater shown in the drawings consists of a box or receptacle 1 of iron or wood if desired, which may be mounted upon legs 2. Within the box and spaced therefrom is mounted the holding member 3 which also serves as a part of the heat storage means. Suitable supports such as the rods 3' may be provided for the member 3. Inner walls for the receptacle of which the member 3 forms a bottom portion may be completed by the plates 4 which may be of thin sheet metal. Between the inner and outer walls of the receptacle may be provided lagging 5 which may be asbestos, powdered silica, lamp black or any suitable heat insulation. The holder 3 may contain openings 6 for the reception of the electrical heating units 7. Conduit 8 is provided for the conductors 9 of said heating units. The holder 3 has a series of partitions 10 mounted in grooves 11 which are formed transversely thereof. Between these partitions are located the storage sections 12 which are shaped to conform with the inner surface of the holding device and as shown in the drawings are circular disks. The holding member 3, the partitions 10 and the storage sections 12 are preferably composed of material such as iron or steel, having high thermal storage capacity and high thermal conductivity. Each of the storage sections 12 has a recess or depression 13 in the top thereof and a pin or bar 14 extending across the same so that a removing tool such as the tongs 15 shown in Fig. 4 may be inserted to remove any section desired. Cover 16 is provided for the storage sections and this may be a metal shell conforming to the shape of the upper portions of the sections and filled with heat insulating material. This cover may be equipped with handles 17 for conveniently removing the same. The storage heater as a whole is provided with the cover 18 which, as shown, consists of a metal shell filled with heat insulating material and provided with the handles 19. Preferably, the shell of cover 18, the conduit 8 and the throat 4' of the wall 4 are very thin and composed of metal having high specific heat resistance such as calorite described in a certain Dempster Patent No. 901,428.

In Fig. 3 I have shown one means for utilizing the heat contained in the heat storage sections consisting of a range 20 having an oven or other cooking chamber 21 which may be suitably insulated. Shelves 22 are provided to support the food to be cooked and the storage sections 12, which supply heat to the same. On top of the range is shown a storage section which may be used for cooking operations such as frying. As shown in the drawing, the storage sections may be made in the shape of a cooking utensil so that the food to be cooked may be put in direct contact therewith.

As shown in Fig. 5, the partitions 23 of the stationary part 24 of the heat storage mass may be integral with the rest of that member and of substantially the same size and shape as the heat storage sections. This form is convenient to construct and affords a large area of contact between the stationary and removable parts of the heat storage mass.

In the operation of my invention heat is supplied by electrical unit 7 and is stored in the holding member 3, the partitions 11 and the sections 12. When it is desired to use one or more of the heating sections for cooking purposes the same may be removed from the storage heater by any suitable means such as tongs 15 and placed in suitable portions of a cooking device such as the range 20 or in any other place where the heat which they contain may be utilized.

Various changes may be made in the shapes, relative arrangement and proportions of the parts shown in the drawing without departing from the spirit of my invention, the scope of which is set forth in the annexed claims.

What I claim as new and desire to secure by Letters Patent of the United States, is:—

1. An electric heat storage device comprising a heat insulating receptacle, a heat storage mass therein consisting of a plurality of removable sections having high heat storage capacity and high heat conductivity and electric heating means supported independently of the said sections in good thermal conductive relation with said heat storage mass.

2. An electric heat storage device comprising a heat insulating receptacle, a heat storage mass therein having high heat storage capacity and high heat conductivity, said mass including a stationary holder and a plurality of removable sections supported thereby and electric heating means for said heat storage mass.

3. An electric heat storage device comprising a heat insulating receptacle, a heat storage mass mounted therein consisting of a plurality of removable sections and partitions separating the same, said sections and said partitions having high heat storage capacity and high heat conductivity, and electric heating means in good thermal conductive relation with said heat storage mass.

4. An electric heat storage device comprising a heat insulating receptacle, a heat storage mass located therein and consisting of a plurality of removable sections having high heat storage capacity and high heat conductivity, and electrical means supported independently of said sections for heating the same, said receptacle having a removable cover to allow any desired number of the said sections to be removed.

5. An electric heat storage device consisting of a heat insulating receptacle, a heat storage mass therein comprising a plurality of removable disk shaped metal sections each supported on end, and electric heating means for the said storage mass supported independently of the said sections.

In witness whereof, I have hereunto set my hand this 2nd day of March, 1912.

HENRY PRICE BALL.

Witnesses:
J. C. MUSGROVE,
H. B. DAVERIN.